US012405595B2

(12) United States Patent
Spenninger et al.

(10) Patent No.: US 12,405,595 B2
(45) Date of Patent: Sep. 2, 2025

(54) SYSTEM AND METHOD FOR CONTROLLING AT LEAST ONE MACHINE, MORE PARTICULARLY A COLLECTIVE OF MACHINES

(71) Applicant: FRANKA EMIKA GmbH, Munich (DE)

(72) Inventors: Andreas Spenninger, Karlsfeld (DE); Sven Parusel, Munich (DE); Simon Haddadin, Munich (DE)

(73) Assignee: FRANKA EMIKA GmbH (DE)

(*) Notice: Subject to any disclaimer, the term of this patent is extended or adjusted under 35 U.S.C. 154(b) by 481 days.

(21) Appl. No.: 17/636,315

(22) PCT Filed: Aug. 20, 2020

(86) PCT No.: PCT/EP2020/073341
§ 371 (c)(1),
(2) Date: Feb. 17, 2022

(87) PCT Pub. No.: WO2021/032841
PCT Pub. Date: Feb. 25, 2021

(65) Prior Publication Data
US 2022/0283568 A1 Sep. 8, 2022

(30) Foreign Application Priority Data
Aug. 20, 2019 (DE) .................... 10 2019 005 787.2

(51) Int. Cl.
*G05B 19/4155* (2006.01)

(52) U.S. Cl.
CPC .................... *G05B 19/4155* (2013.01); *G05B 2219/31455* (2013.01)

(58) Field of Classification Search
CPC ...... G05B 19/4155; G05B 2219/31455; G05B 19/41845; Y02P 90/02
See application file for complete search history.

(56) References Cited

U.S. PATENT DOCUMENTS 3,668,653 A * 6/1972 Fair .................... G05B 19/4181 700/169
2018/0104819 A1* 4/2018 Zyda ...................... B25J 9/1682
2020/0364173 A1* 11/2020 Kuzmin .............. G06F 13/4282

FOREIGN PATENT DOCUMENTS

CN 106794580 A * 5/2017 ............ B25J 9/1656
CN 108390877 A * 8/2018 ............. H04L 69/08
DE 1953662 C2 7/1982
DE 19923285 A1 * 11/2000 ....... G05B 19/40931
DE 102012217573 A1 * 3/2014 ........... G02B 27/017
(Continued)

OTHER PUBLICATIONS

Search Report issued in International Application No. PCT/EP2020/073341, issued Nov. 12, 2020, 2 pages.

*Primary Examiner* — Yuhui R Pan
(74) *Attorney, Agent, or Firm* — Dilworth IP, LLC

(57) ABSTRACT

A system for controlling at least one machine which is assigned an individual machine language including defined command variables, the machine undergoing a change of state in the course of the control, having a control module which is designed to transform command variables of an interaction language into corresponding command variables of an individual machine language depending of the type of machine and/or the machine language assigned thereto.

14 Claims, 7 Drawing Sheets

(56) References Cited

FOREIGN PATENT DOCUMENTS

| | | | |
|---|---|---|---|
| DE | 102019100766 | A1 * | 2/2020 |
| WO | 2015187271 | A1 | 12/2015 |

* cited by examiner

Z6
K6
Z8
K8
A
K9
Z5
Z9
B
K7
K5
Z7
Z3
K3
Z4

K4
K1
K2
Z1
Z2

SYSTEM AND METHOD FOR CONTROLLING AT LEAST ONE MACHINE, MORE PARTICULARLY A COLLECTIVE OF MACHINES

FIELD OF THE INVENTION

The present invention relates to a system and a method for controlling at least one machine, in particular to a system and a method for synchronously or asynchronously controlling a collective of machines.

BACKGROUND

Basically, each machine, as this is to be defined in the following, has its own individualized or individual machine language, which is composed of defined command codes. The command structure or command syntax forming this machine language is designed so that the machine can be programmed or controlled or activated in order to execute defined functions assigned to it or, if applicable, functions generated by autonomous planning, on the basis of which the machine then interacts with the environment. I.e., by means of the machine language a user controls the machine and gives to the machine instructions via appropriate commands, so that it can accomplish defined operations. These instructions can refer both to the programming of the machine (setup) itself and to the actual machine control during operation.

One problem in the interaction of several machines of different design is, among other things, that each manufacturer of a machine uses its own machine language, specially trained and designed for it, which may be based on its own programming logic and is incompatible or only compatible with restrictions with the machine languages of the other manufacturers. This also affects the user, who must use and learn different programming and control commands for each machine.

In this case, a machine is programmed in advance with regard to the operations to be performed by it within the framework of the intended programming language, in order to generate the corresponding control commands for this purpose, which are then to be executed following the programming.

As a rule, the control commands, defined as command variables, are entered via a human-machine interface (HMI). In a machine, e.g., a robot from one manufacturer, the HMI can be designed to display a control command, e.g., "Move effector from position A to position B", via an individually designed graphical user interface, which the user then actuates. The control system of a robot from another manufacturer also knows this control command, but it may be implemented in the robot's input and control system via other algorithms and must be programmed or activated by a user in a different way, e.g., purely textually.

Consequently, the individual control systems of machines, robots, etc. can differ from each other in such a way that, in order to perform one and the same operation, different programming steps and/or command inputs must be performed by a user in each case, which can differ in terms of their complexity and thus user-friendliness. Needless to say, this is cumbersome and costly. Users have to be trained separately for each machine. Furthermore, it proves to be disadvantageous that specific expert knowledge concerning a machine (programming) language as well as the functionality of the machine itself is required.

In addition, in a machine collective, where different machines are to work together on a production line, for example, each machine is programmed and controlled separately, and these machines in turn have to be coordinated with each other in terms of their interaction. Individual machines may not have been designed in advance to cooperate with each other, let alone to communicate with each other. Integrating different machines, such as robots, conveyors, machine tools, sensors, etc., into a common context of a production plant so that they can work together effectively and without errors is therefore very cumbersome and time-consuming, accompanied by expense.

These steps must always be programmed in advance in the respective machine's own programming language. This does not at all make a simultaneous coordination of several machines using different programming languages, which are to cooperate in the course of one or several operations, possible, i.e., a synchronization of these machines, which are not compatible in their programming and command languages, with respect to the operations to be executed together, which synchronization is realized quasi "live" during the individually executed programming.

It is also conceivable that similar machines or different machines and units of a collective are distributed locally, so that uniform, common and/or simultaneous control by one user on site is not possible.

Against this background, it is an object of the present invention to create a system and to provide a method with the aid of which at least one machine can be controlled in a simple manner independently of the machine language inherent in this machine. In particular, however, it is an object of the invention to control a collective of usually different machines.

SUMMARY

These objects are solved with a system for control according to claim 1 and with a method for control according to claim 8.

In a first aspect, the invention relates to a system for controlling at least one machine assigned with an individual machine language comprising defined command variables, wherein in the course of the control the machine undergoes at least one state change, comprising:

- a human-machine interface allocated with an interaction language comprising defined command variables; and
- at least one control module which is configured to generate, depending on the type of machine and/or the machine language assigned thereto, with respect to a command variable of the interaction language and/or with respect to a command variable of the individual machine language, at least one control function which is designed to transform the command variable of the interaction language into an associated command variable of the individual machine language.

In the context of the present disclosure, "machine" shall be understood herein in the sense of a generic term as a unit or component of any embodiment to be controlled, which can perform one or more operations in an interaction with the environment, an object, a workpiece and/or a human being, and which may comprise, for example:

- machine tools of any type
- stationary or mobile robots,
- industrial robots
- lightweight robots with or without human-robot collaboration capabilities

- sensors of any kind
- manipulators
- computing units
- transport units
- simulations
- household appliances
- medical and surgical devices
- sorting systems and devices
- autonomous vehicles
- mobile platforms
- signaling equipment
- etc., i.e., in principle, any actual or virtual entity that has an independent command structure (i.e., machine language) for its function and/or interaction with the environment reflecting the state changes, which can be or must be used by a user.

"Command variables" (or command codes) in the context of the present disclosure are intended to mean any instructions that may result from a user input and cause the machine to perform a particular function and/or execute a particular operation.

In a further aspect of the invention, the control module is further configured, depending on the type of machine and/or the machine language associated therewith, to generate at least one inverse control function with respect to a status variable of the interaction language and/or with respect to a status variable of the individual machine language, which is configured to transform a status variable of the individual machine language into an associated status variable of the interaction language.

This serves on the one hand for feedback control within the control module during the execution of a command and on the other hand in a superordinate context then also for the representation of a detected state of the machine or a state change of the machine in e.g., a representation module of the HMI.

By "status variables" (or also signal variables, state signals) in the context of this disclosure all variables are to be understood, which in the course of the state changes of the machine effected by the command variables then enable a feedback to the control module or the user via the transformation in the interaction language, including disturbance variables having a possible influence.

The core of the invention is therefore to be seen in the fact that, with respect to any controlled variable, the outward transformation via a first control function between the interaction language and the machine language on the one hand and, with respect to any status variable, the backward transformation via an inverse control function between the machine language and the interaction language on the other hand is programmatically mapped by the system or the method according to the invention in the broadest sense as an execution of a process computing model.

The method or system according to the invention enables live control of at least one machine by a user with immediate feedback from the machine as the machine executes the commands entered by the user. In contrast to machine programming, which must actually be performed in time before the operations resulting from the commands are executed, in the invention the control by the user is performed "on-the-fly", i.e., in real time. There is always direct interaction between the user and the machine(s); the codes resulting from the control functions and inverse control functions are generated while the program underlying them is running. In other words, the method implemented according to the invention is quasi "programming in the loop".

As in the case of an objective microcomputer, which contains controller programs that are configured and parameterized depending on the structure and the parameters of the underlying controller laws, according to the invention a virtual process computer is implemented, whereby the system assumes how the controller programs could be configured, so that in terms of a corresponding controller law the control functions for the transformation of the command or status variables can be generated, which reflects the actual abstraction process.

The transfer of a command variable of an interaction language into a corresponding command variable of a machine language can therefore be described in general terms as a directed state-space model.

In simplified terms, according to the invention, the system-side control module establishes communication with a machine-side control module in order to link a command variable stored in the interaction language of the system-side control module, which corresponds to a defined operation, with a corresponding command variable stored in the machine language of the machine-side control module, wherein the system-side control module is external to and superordinate to the machine-side control module.

The actual process of transformation in both directions is basically a mapping with input variables (=controlled variables of the interaction language), output variables (=manipulated/controlled variables in the machine language) and status variables (e.g., sensor signals via the change of state), whereby a constant feedback or back coupling can be active with regard to the control functions via the status variables and, if necessary, incoming disturbance variables.

The system according to the invention functions quasi analogously to a "simultaneous translator".

For that, the operation of the process computing model does not necessarily have to be deterministic. The future output of the controlled variable to be determined via the control function does not necessarily have to be known in advance, as this may also only result from the interaction of the machine with the environment, whereby the state change is reflected, for example, by forces occurring at the machine or by movement patterns of the machine.

The process computing model implemented in this way is subjected to continuous feedback control, taking into account parameters and/or disturbance variables, which may be actual physical variables measurable during the state change and/or virtually generated variables.

In a further embodiment of the system, the control module may further be configured such that the control function is generated depending on the inverse control function and/or vice versa.

Furthermore, the control module may be configured to change the control function and/or the inverse control function during the state change of the machine, for example, depending on predetermined or actual feedback parameters.

In other words, the system according to the invention can be designed to be open in functional and/or temporal terms. For example, approvals, i.e., what should be realized on the machine side in any case, and restrictions, i.e., what must not occur on the machine side in any case, can be added to or removed from the individual control functions in-line.

On the program side, an abstraction of an individual machine language specified for a machine is brought about by the process computing model thus realized according to the invention for the outward transformation of command variables and the backward transformation of status variables.

In a preferred embodiment according to the invention, the system and the method described below are designed in particular for controlling a collective which is composed of several different types or classes of machines.

In this case, a plurality of machines is provided, each of which is assigned an individual machine language, wherein the control module is configured to generate at least one corresponding control function and at least one corresponding inverse control function for each machine.

The machine languages are generally not compatible with each other or are compatible only with restrictions.

The collective can be designed as a potentially heterogeneous system or network, e.g., a production plant consisting of several machines and robots, each of which performs different tasks and comes from different manufacturers and therefore comprise and use different, incompatible machine languages.

Consequently, "collective" in the context of the present disclosure is to be understood not only as machines which are not physically coupled to each other, but which cooperate in some form, as in the case of production plants, but also as systems which are physically coupled to each other, such as, for example, a robot arm which carries a gripper mechanism at its distal end. The robot arm comes from a first manufacturer and has its own machine language (=robot language), while the gripper mechanism mounted on it comes from a second manufacturer and has its own machine language (=gripper language) separate from the robot language.

In principle, there are no limits to the physical design of the collective for realizing and applying the system and method according to the invention. The members/machines of the collective can be distributed locally and/or globally and can be interconnected via a network or wirelessly.

Against this background, the control module is further configured to generate the control functions and the inverse control functions synchronously or asynchronously with respect to the machines of a collective.

In other words, the control of the individual machines of the collective by a user via the interaction language can be performed individually, simultaneously or depending on the desired sequence of the collective.

Regardless of the machine languages and the number of machines, the system and method according to the invention implement a uniform abstraction on the program side with respect to all the different machine languages that are present in a collective of machines.

The interaction language functions quasi as a kind of abstraction language, whereby a uniform system for the control of at least one machine of a collective is proposed, which can be used independently of the control system residing inside this machine and/or the programming type and machine language intended for this in each case, since it is able to communicate with all different machine languages of machines, like e.g. robots, of the most different design and/or from different manufacturers.

The user can refer to the simplified programming of the higher-level system, which can preferably be identified by a simple operating logic (e.g. dialog-based, purely textual or via graphical symbols) of a graphical user interface of the HMI, in order to transfer an operation command to the individual control system of the machine, which is then executed by the latter without the user having to go into the possibly very complicated logic of the control system on the machine side in more detail.

A user therefore does not have to deal in detail with all the programming instructions of control systems of different machines/robots available on the market and familiarize himself with them in order to have a simple operation carried out by the machine/robot or even by a collective of machines/robots, but can make use exclusively of the higher-level system, which in terms of its programming has a much simpler logic and therefore better user-friendliness.

The higher-level system forms a quasi-generalized operating system for many machines, for example all robots on the market. It can be easily adapted to new operating or control systems, as well as machine languages, of existing or new machine or robot systems and also to new operations to be carried out without great programming effort.

In addition to simplified operation across several machine classes, the provision and realization of the system according to the invention and the following described method according to the invention results in a considerable time saving in the control, both in terms of programming (setup) and operation of the machines, which is accompanied by a significant economic advantage.

In addition, the system according to the invention makes it possible in a simple manner to actuate machines or machine collectives which are spatially separated from one another, either simultaneously or with a time delay.

In particular, the system of the invention is also designed to autonomously recognize with which machine-side control system, i.e., with which machine language, it is currently connected or is to communicate, in order to then autonomously provide the "translation" or transformation algorithms necessary for the desired command variable to generate the control functions. Such an autonomous "mapping" can be done or implemented by appropriate learning or deep learning algorithms or neural networks.

In this context, the invention also relates to a method for controlling at least one machine, which is assigned an individual machine language comprising defined command variables, by means of a control module which interacts with a human-machine interface, which is assigned an interaction language also comprising defined command variables, wherein, in the course of the control, the machine undergoes a state change, comprising the steps:

- recognizing the type of machine and/or the machine language assigned to it;
- generating, depending on the type of machine and/or the machine language associated therewith, a control function with respect to a command variable of the interaction language and/or with respect to a command variable of the individual machine language; and
- transforming the command variable of the interaction language into a corresponding command variable of the individual machine language by applying the control function.

Further, the method comprises the steps of:

- depending on the type of machine and/or the machine language associated therewith, generating an inverse control function with respect to a status variable of the interaction language and/or with respect to a status variable of the individual machine language; and
- transforming the status variable of the individual machine language into an associated status variable of the interaction language using the inverse control function.

The method is further characterized in that the control function may be generated as a function of the inverse control function and/or vice versa.

In a further embodiment of the method, the control function and/or the inverse control function can be changed during the state change of the machine.

According to the invention, all this happens during the course or execution of the underlying operations, i.e., "on-the-fly".

Preferably, the method according to the invention is configured such that, if multiple machines are provided, each of which is assigned an individual machine language, a control function and an inverse control function are generated for each machine, wherein the control functions and the inverse control functions can be generated synchronously or asynchronously with respect to the machines.

The system or method according to the invention enables a user to control a machine or a machine collective directly and in real time online via a corresponding network, irrespective of the type of machines and their programming and command languages.

BRIEF DESCRIPTION OF THE DRAWINGS

Further features and advantages of the invention will be apparent from the description of the embodiments explained with reference to the accompanying drawings.

DETAILED DESCRIPTION

Figure 1:
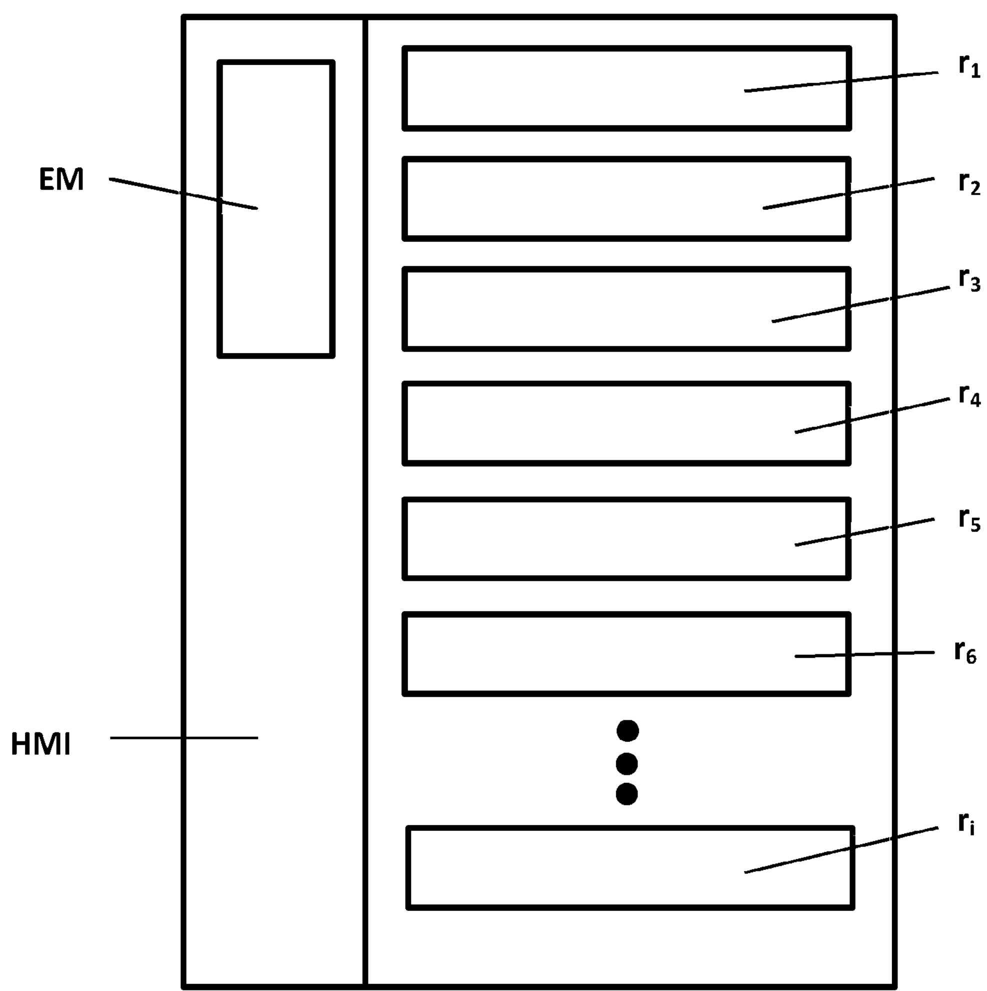
FIG. 1 a schematic representation of a human-machine interface.

FIG. 1 schematically shows a human-machine interface HMI with the aid of which a user can enter input commands of an interaction language assigned to this HMI, visually, textually, by voice control, via graphic symbols or a virtual reality device via an input module EM. At the same time, the user receives feedback via the HMI about the status of a machine, component, or unit to be controlled by the system according to the invention, or of a machine collective to be controlled.

The interaction language forms, so to speak, the user-side command language which, according to the invention, is preferably designed uniformly with respect to all machines with which the system is to interact.

Corresponding command variables $r_1, \ldots, r_i$, are stored or predefined in the interaction language. If the machine to be controlled is, for example, a robot, the command variable $r_1$ can mean, for example, "Move the robot from position A to position B", whereby the type of robot and its inherent machine language are not necessarily known to the system and thus to the user for operating the interaction language.

The machine language of the machine comprises all instructions defined by command variables, which can be directly executed by the machine in the context of operations, whereby the set and the formal structure or syntax of these instructions, i.e., the instruction set, differ from machine to machine, even if the machines come to the same result in the context of the implementation of a command variable. For example, a six-axis, position-controlled robot from a first manufacturer with a first machine language (machine code, machine program) is just as capable as a six-axis, position-controlled robot from a second manufacturer with a second machine language, which may be technically different, of moving its effectors from position A to position B, i.e. the result or the functional performance of both robots is identical, but the execution is carried out using different command variables of the machine language.

Figure 2:
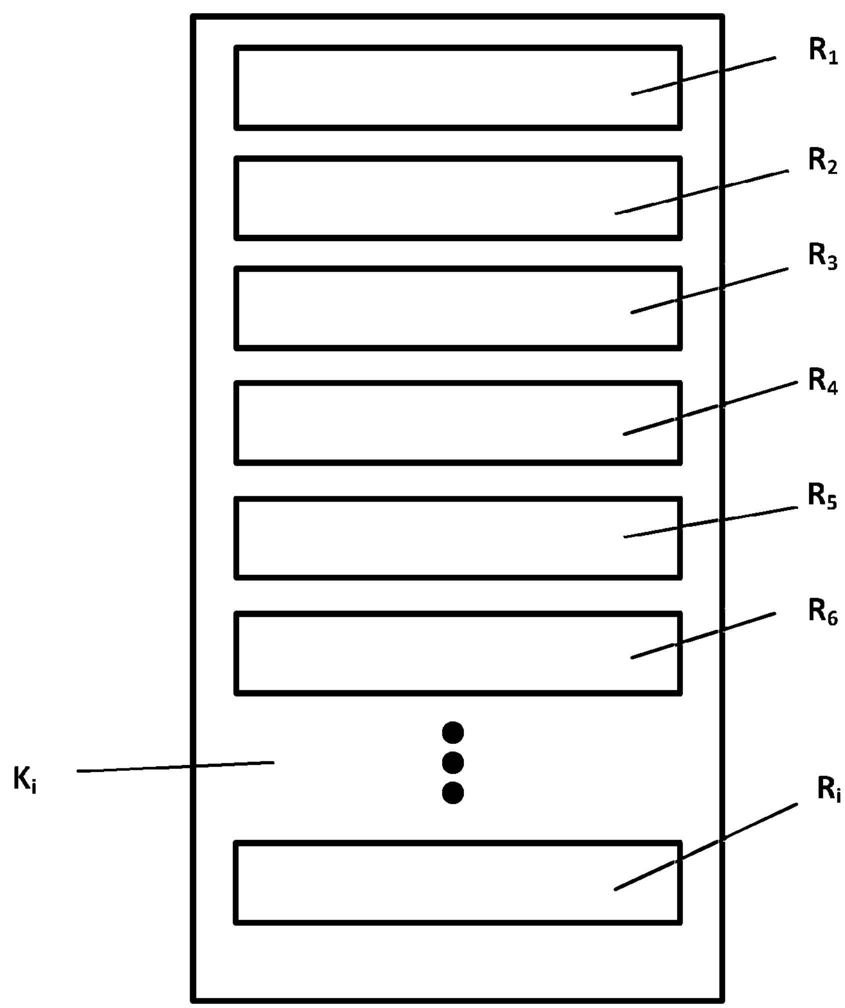
FIG. 2 a schematic representation of a machine to be controlled.

FIG. 2 schematically shows the structure of a machine $K_i$ to be controlled by the system according to the invention.

This machine $K_i$ has an independent machine language which is not identical with the user-side interaction language with respect to type and programming. In this machine language, which does not have to be identical with or compatible with the machine languages of other machines or machine classes, command variables $R_1, \ldots, R_i$ are also stored, which correspond to the command variables of the interaction language with respect to their execution, i.e., the result to be achieved.

In the example given, the command $R_i$ of the machine language therefore also means "Move the robot from position A to position B", whereby the command variables $R_2$ to $R_i$ can comprise further commands which can be executed following the command $R_1$.

Figure 3:
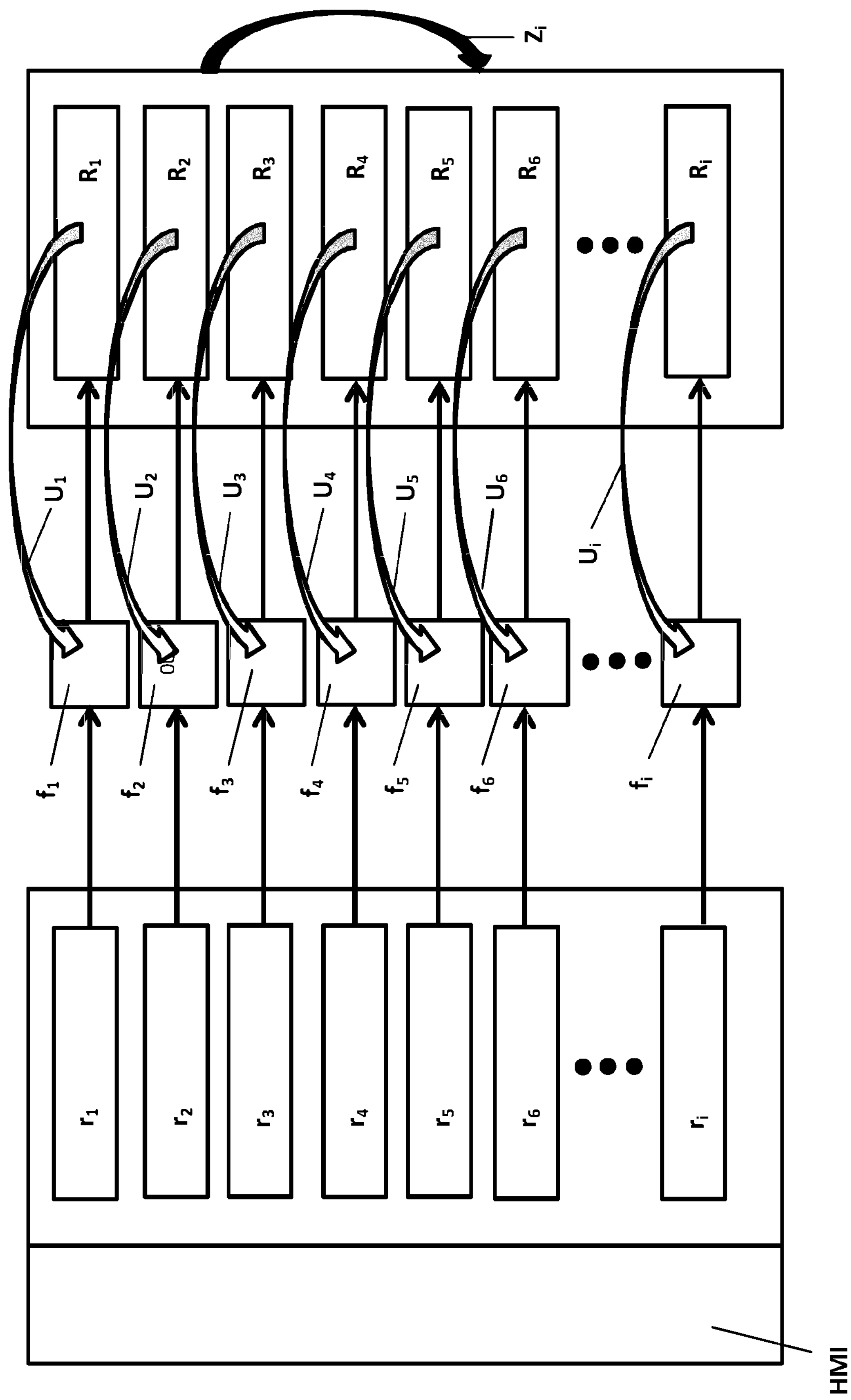
FIG. 3 a schematic representation of a structure of a system according to the invention with respect to the control of a single machine $K_i$.

FIG. 3 schematically shows the structure of a system according to the invention with respect to the control of a single machine $K_i$.

The system according to the invention is designed, for example by appropriate programming with respect to the software or at least of a computing kernel, to generate at least one control function $f_1, \ldots, f_i$ with respect to each command variable $r_1, \ldots, r_i$ of the interaction language, with which this command variables $r_1, \ldots, r_i$ are converted or transformed to the command variable $R_1, \ldots, R_i$ of the machine language of the machine $K_i$ assigned or corresponding to it in each case.

According to the invention, this process is carried out in such a way that the control functions $f_1, \ldots, f_i$ are determined via at least one algorithm stored or implemented in the software or the computing kernel depending on the type or class of the machine $K_i$, for example a six-axis, position-controlled robot, of the individual (usually manufacturer-dependent) machine language inherent in this machine $K_i$ and/or of the type of command itself.

In fact, the command structure or command syntax of the interaction language does not have to know the command structure or command syntax of the machine $K_i$.

The machine $K_i$ itself is described as a computing model of a state machine, which undergoes a state change in the course of the execution of each command variable, which is exemplified by the arrow $Z_i$ in FIG. 3. In its simplest form, the computing model can be described as a Turing machine.

Here, the state change need not necessarily be dynamic in nature. The machine $K_i$ can, for example, also be a sensor of any kind which current state, i.e. measured value, is queried via a corresponding input in the interaction language by means of a command variable $r_2$, e.g., in the sense of "determine prevailing temperature", in that the control module of the system generates a corresponding control function $f_2$ which maps this input to the controlled variable $R_2$ of the machine (sensor) language in the sense of "determine prevailing temperature" of the sensor. The temperature as a status variable or state signal can then be transferred back to the control module or HMI for display or transmission of the information to the user, which will be explained below in the context of FIG. 4.

According to the invention, the control module is further designed to provide a continuous feedback from the command variables $R_1, \ldots, R_i$ of the machine $K_i$ in the course of the generation of the control functions $f_1, \ldots, f_1$, which is symbolically represented by the arrows $U_1, \ldots, U_i$.

Consequently, the invention is characterized by the virtual implementation of a process computing model for communication between a user-defined interaction language and a predetermined, individualized machine language, in the broadest sense the basic structure of a control loop in which actual and/or virtual status variables and/or disturbance variables are included in the feedback control. According to the invention, such a control loop is preferably generated virtually by programming, with the individual command variables as virtual controlled variables.

In order to recognize whether and to what extent the state change (e.g., "robot has moved from position A to position B") of the respective machine to be controlled has occurred, the system (and thus the user via the HMI) must be provided with corresponding feedback.

Figure 4:
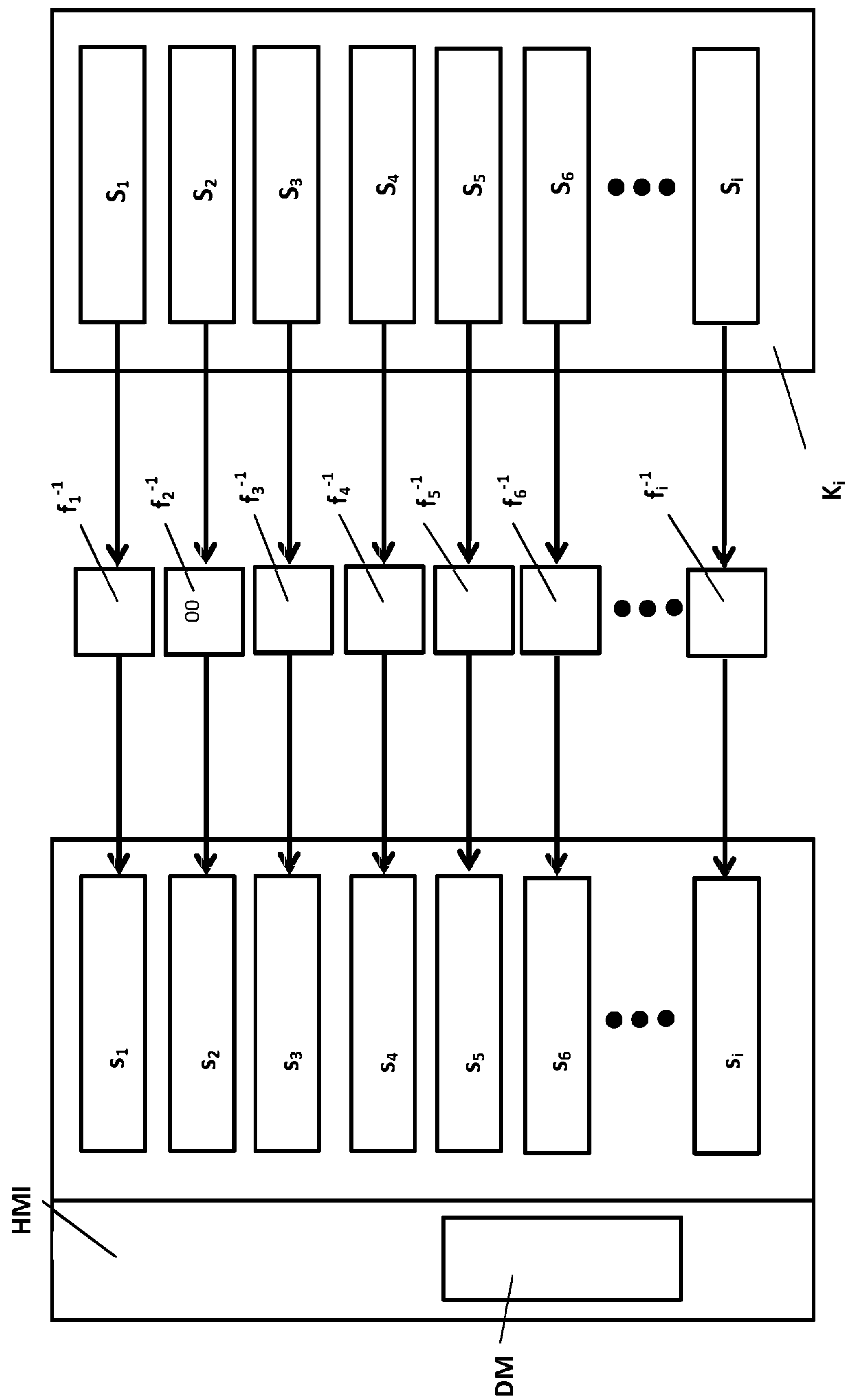
FIG. 4 a further schematic representation of a structure of a system according to the invention with respect to the control of a single machine $K_i$.

This is exemplarily shown in FIG. 4.

The machine language of the machine $K_i$ is assigned a set of status variables $S_1, \ldots, S_i$. These status variables $S_1, \ldots, S_i$ in turn correspond to a set of equivalent status variables $s_1, \ldots, s_i$ defined in the interaction language.

According to the invention, the at least one control module is further configured in such a way that, with respect to a status variable $s_1, \ldots, s_i$ of the interaction language, at least one inverse control function $f_1^{-1}, \ldots, f_i^{-1}$ is generated in each case, which is designed to transform or map a corresponding status variable $S_1, \ldots, S_i$ of the machine $K_i$ into the associated status variable $s_1, \ldots, s_i$ of the interaction language.

Here, too, the generation of the inverse control function follows the approach according to the invention of mapping the communication between the machine language and the interaction language as a process computing model, with corresponding algorithms being stored in the control module for this purpose.

Both the outward transformation with respect to a controlled variable via the generation of a control function $f_i$ and the backward transformation with respect to a status variable, which can have a functional relationship with the controlled variable, via the generation of an inverse control function $f_i^{-1}$ produce a uniform abstraction at the interface to the interaction language across all machines $K_i$ to be controlled, preferably of one class. The output of the information thus obtained (position reached, temperature, etc.) can be communicated to the user via a suitably designed display module DM.

According to the invention, the user therefore needs only one interaction language with a defined command set to control or communicate with machines, components and/or machine assemblies. The interaction language is preferably designed to be user-friendly and easy to understand, e.g., via an app control on a graphical user interface, and is independent and autonomous in relation to all machine languages of the machines to be controlled.

The system according to the invention is therefore designed to achieve abstraction across all different machine languages by means of predetermined algorithms implemented in the system, by taking into account all possible virtual and/or actual parameters related to the process computing model realized by these algorithms, such as controlled variables, status variables as well as possible disturbance variables (e.g., latencies).

In a preferred embodiment, however, the system is used to control a preferably potentially heterogeneously distributed collective of machines, components, or units.

Figure 5:
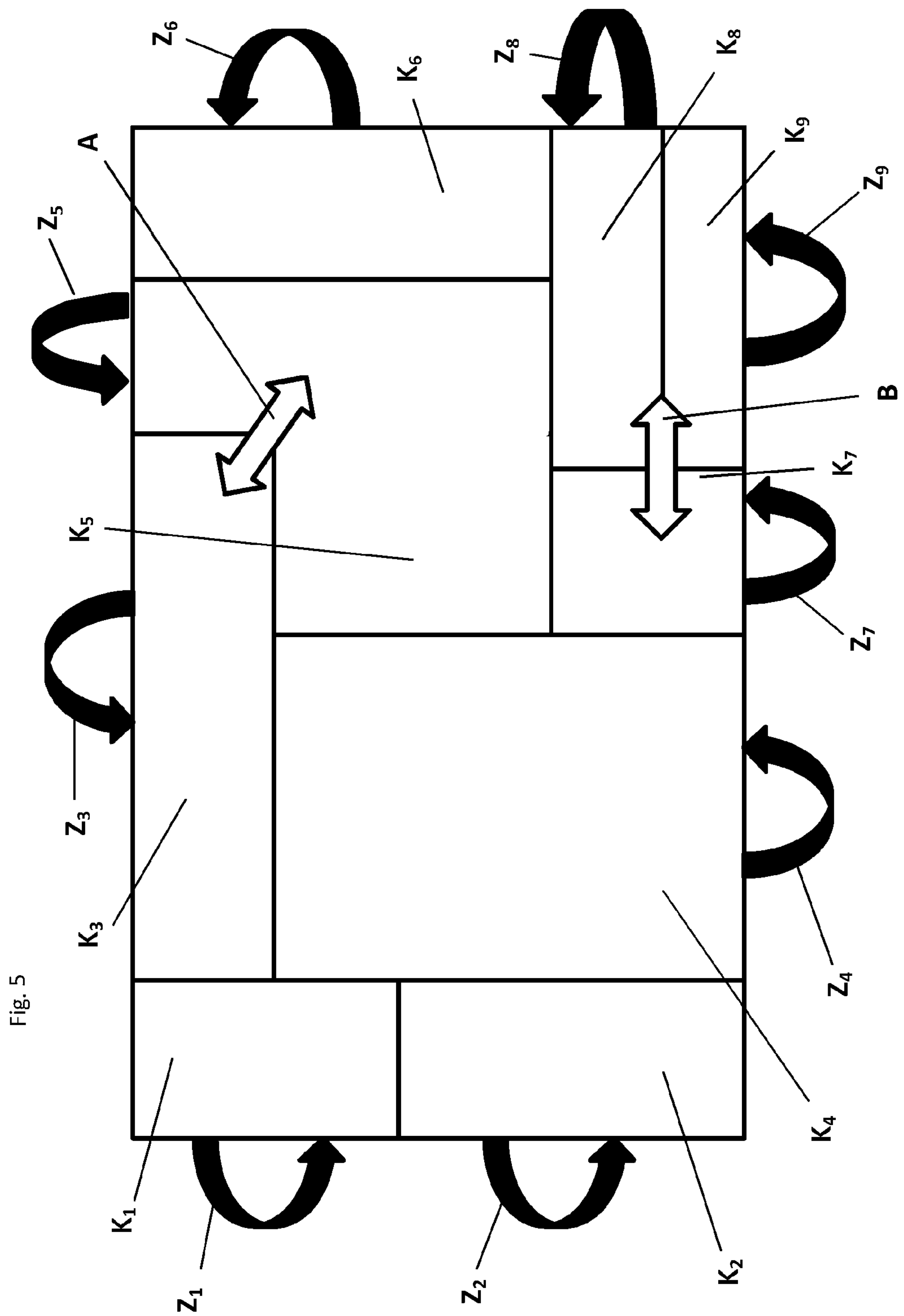
FIG. 5 a schematic representation of a collective of machines.

FIG. 5 schematically shows such a collective consisting of the machines $K_1$ to $K_9$.

Each machine $K_1$ to $K_9$ experiences a state change $Z_1$ to $Z_9$, which occurs in the course of the control.

The machines themselves do not have to be functionally related and can also be located at different places. However, they can also work together without having to have compatible machine languages, for example in the context of a common production plant, which is exemplarily represented by the arrows A, B. For example, the machine $K_8$ can be a machine tool that is loaded by a robot $K_7$, which removes workpieces from a conveyor $K_9$ and returns them to it after machining.

Although the machines $K_7$ to $K_9$ themselves have different, mutually incompatible machine languages, the communication of the machines with each other, their control and, if necessary, also programming is carried out via the abstraction principle according to the method of the invention with the interaction language as a uniform command language for all machines $K_7$ to $K_9$.

Figure 6:
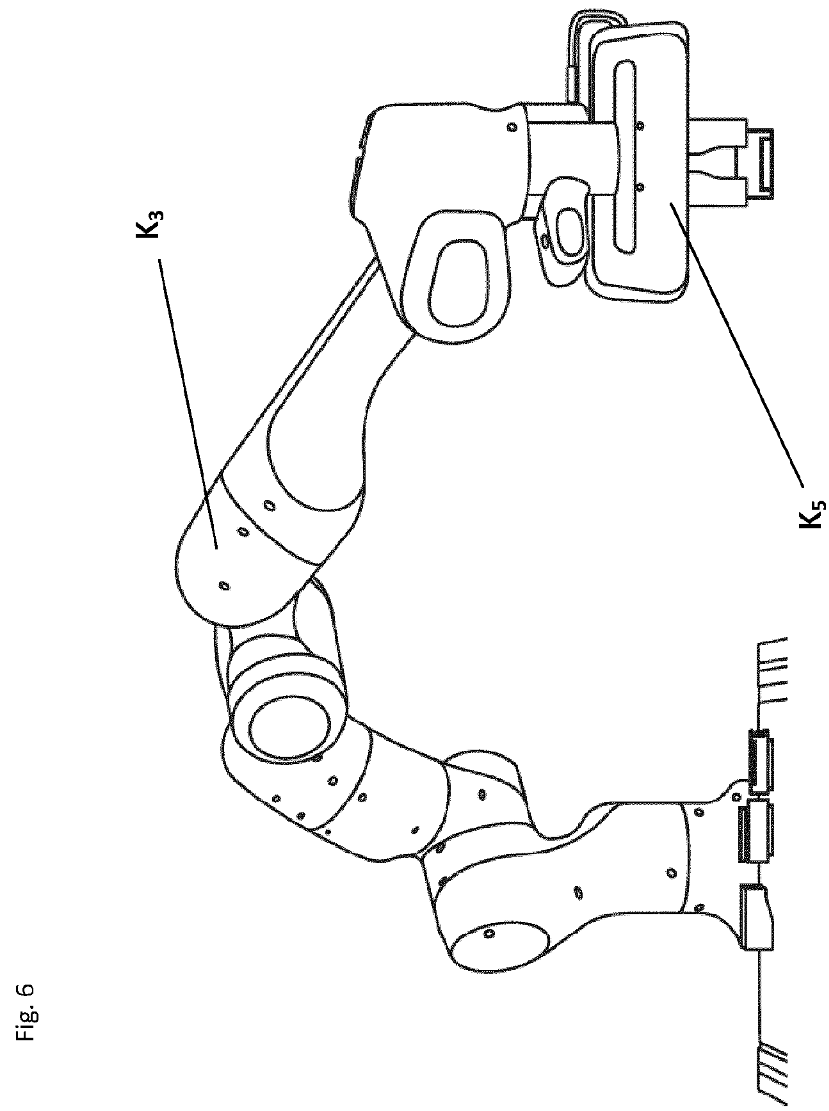
FIG. 6 a representation of a robot as a physically connected collective.

However, the collective can also be several components of a single, independent machine which functionally interact, such as, for example, a robot arm $K_3$ of one manufacturer which carries at its distal end a gripper mechanism $K_5$ of another manufacturer, as this is exemplarily shown in FIG. 6, whereby the robot arm $K_3$, or its control/machine language, and the gripper mechanism $K_5$, or its control/machine language, can have only partial or no information from each other.

Figure 7:
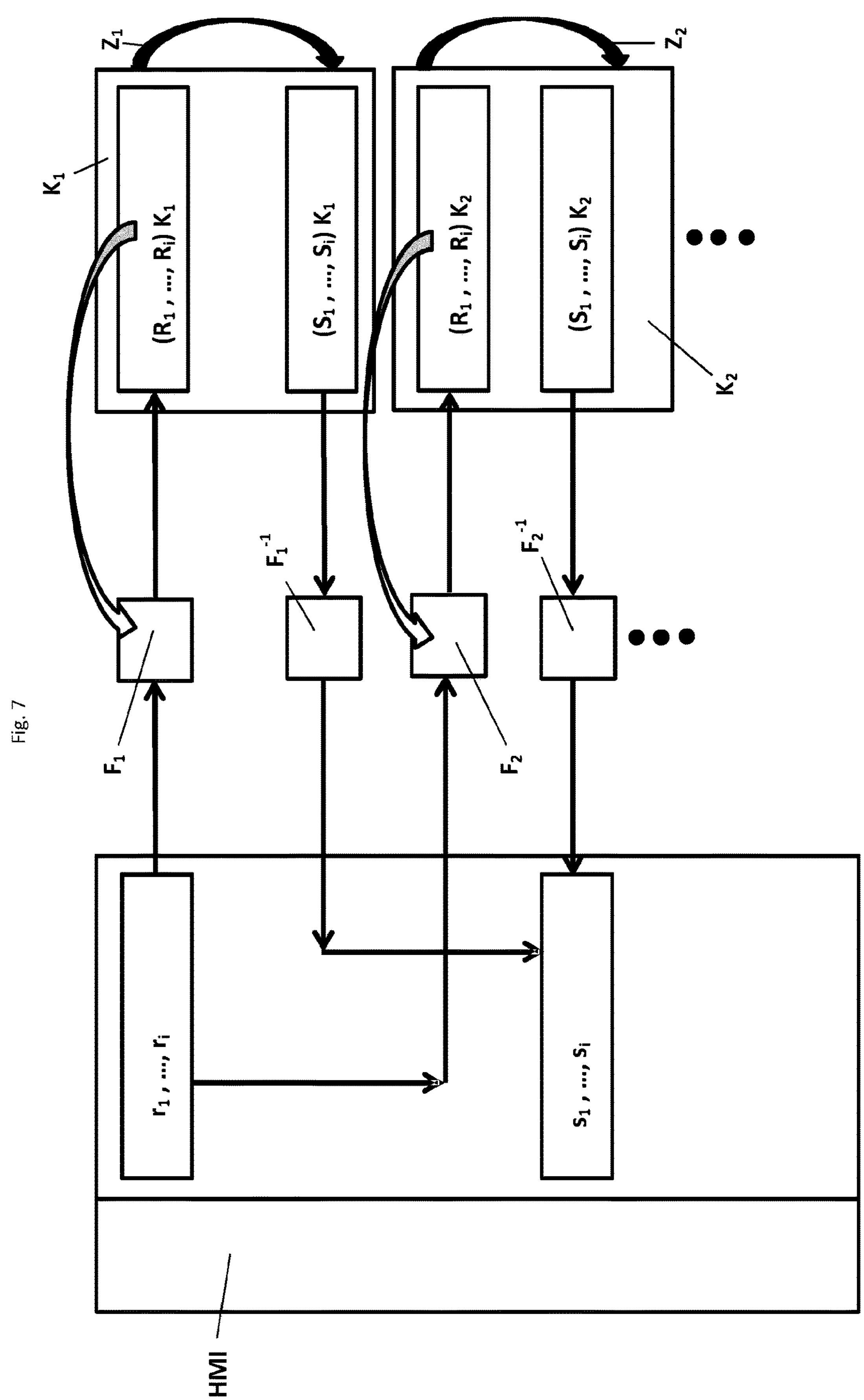
FIG. 7 a schematic representation of a structure of a system according to the invention with respect to the control of a collective of machines.

FIG. 7 schematically shows the control of a collective according to the method according to the invention.

Each machine $K_1$ and $K_2$ comprises a set of command variables $(R_1, \ldots, R_i) K_1$ and $(R_1, \ldots, R_i) K_2$ in their own machine language. Likewise, a set of status variables $(S_1, \ldots, S_i)K_1$ and $(S_1, \ldots, S_i)K_2$ is assigned to each machine $K_1$ and $K_2$, which are already present (e.g., existing temperature) or are only set by a state change as a result of the control (e.g., then changed temperature).

According to the invention, therefore, a corresponding set $F_1$ of control functions $f_1$-$f_i$ for the machine $K_1$ and set $F_2$ of control functions $f_1$-$f_i$ for the machine $K_2$ is generated with respect to each controlled variable and a corresponding set $F_1^{-1}$ of inverse control functions $f_1^{-1}$-$f_i^{-1}$ for the machine $K_1$ and $F_2^{-1}$ of inverse control functions $f_1^{-1}$-$f_i^{-1}$ for the machine $K_2$ is generated with respect to each status variable, as previously explained in connection with FIGS. 3 and 4.

This allows a uniform abstraction to be realized across all machine classes or types and their machine languages.

The generation of the individual control functions is possible through predefined and/or adaptable and/or via (Deep) Learning algorithms, which are implemented in the control module (software, computing kernel). This creates a formal interaction model, i.e., a type of interaction control, with which the user can actuate different machines, which are inevitably incompatible with each other in terms of their machine language, individually, i.e., asynchronously, or synchronously, so that these machines are integrated in a higher process context, as would be the case, for example, in a production plant consisting of different machines.

The invention claimed is:

1. A system for controlling at least one machine ($K_i$), which is assigned an individual machine language comprising defined command variables ($R_1, \ldots, R_i$), the at least one machine ($K_i$) undergoing a state change ($Z_i$) in a course of the control, comprising:

a human-machine interface (HMI) associated with an interaction language comprising defined command variables ($r_1, \ldots, r_i$); and a control module which is configured, depending on a type of the at least one machine ($K_i$) and/or the machine language assigned thereto, with respect to a command variable ($r_1, \ldots, r_i$) of the interaction language and/or with respect to a command variable ($R_1, \ldots, R_i$) of the individual machine language to generate a control function ($f_1, \ldots, f_i$) which is designed to transform the command variable ($r_1, \ldots, r_i$) of the interaction language into an associated command variable ($R_1, \ldots, R_i$) of the individual machine language, wherein the control module is further configured, depending on the type of the at least one machine ($K_i$) and/or the machine language assigned thereto, with respect to a status variable ($s_1, \ldots. s_i$) of the interaction language and/or with respect to a status variable ($S_1. \ldots S_i$) of the individual machine language to generate an inverse control function ($f_1^{-1}, \ldots, f^{-1}$), which is designed to transform a status variable ($S_1, \ldots, S_i$) of the individual machine language into an associated status variable ($s_1, \ldots. s_i$) of the interaction language.

2. The system according to claim 1, in which the control module is further configured to generate the control function ($f_1, \ldots, f_i$) depending on the inverse control function ($f_1^{-1}, \ldots, f_i^{-1}$) and/or vice versa.

3. The system according to claim 1, in which the control module is further configured to change the control function ($f_1, \ldots, f_i$) and/or the inverse control function ($f_1^{-1}, \ldots, f_i^{-1}$) during the state change of the machine ($K_i$).

4. The system according to claim 1, in which a plurality of machines ($K_1, \ldots, K_i$) is provided, each of which is assigned an individual machine language, and in which the control module is designed to generate a control function ($f_1, \ldots, f_i$) and an inverse control function ($f_1^{-1}, \ldots, f_i^{-1}$) for each machine ($K_1, \ldots, K_i$).

5. The system according to claim 4, in which the control module is further configured to generate the control functions ($f_1, \ldots, f_i$) and the inverse control functions ($f_1^{-1}, \ldots, f_i^{-1}$) synchronously or asynchronously with respect to the machines ($K_1, \ldots, K_i$).

6. The system according to claim 1, in which the at least one machine ($K_i$) is a robot or a part of a robot.

7. A method for controlling at least one machine ($K_i$), which is assigned an individual machine language comprising defined command variables ($R_1, \ldots, R_i$), by means of a control module which interacts with a human-machine interface (HMI), which is assigned an interaction language comprising defined command variables ($r_1, \ldots, r_i$), the machine ($K_i$) undergoing a state change ($Z_i$) in a course of the control, comprising steps:

recognizing a type of the at least one machine ($K_i$) and/or the machine language assigned to it;

generating, depending on the type of the at least one machine ($K_i$) and/or the machine language associated therewith, a control function ($f_1, \ldots, f_i$) with respect to a command variable ($r_1, \ldots, r_i$) of the interaction language and/or with respect to a command variable ($R_1, \ldots, R_i$) of the individual machine language; and transforming the command variable ($r_1, \ldots, r_i$) of the interaction language into an associated command variable ($R_1, \ldots, R_i$) of the individual machine language using the control function ($f_1, \ldots, f_i$);

wherein the method further comprises:

depending on the type of machine ($K_i$) and/or the machine language associated therewith, generating an inverse control function ($f_1^{-1}, \ldots, f_i^{-1}$) with respect to a status variable ($s_1, \ldots, s_i$) of the interaction language and/or with respect to a status variable ($S_1, \ldots, S_i$) of the individual machine language; and transforming the status variable ($S_1, \ldots, S_i$) of the individual machine language into an associated status variable ($s_1, \ldots, s_i$) of the interaction language using the inverse control function ($f_1^{-1}, \ldots, f_i^{-1}$).

8. The method according to claim 7, in which the control function ($f_1, \ldots, f_i$) is generated depending on the inverse control function ($f_1^{-1}, \ldots, f_i^{-1}$) and/or vice versa.

9. The method according to claim 7, in which the control function ($f_1, \ldots, f_i$) and/or the inverse control function ($f_1^{-1}, \ldots, f_i^{-1}$) are changed during the state change ($Z_i$) of the machine ($K_i$).

10. The method according to claim 7, in which a plurality of machines ($K_1, \ldots, K_i$) is provided, each of which is assigned an individual machine language, comprising:

generating a control function ($f_1, \ldots, f_i$) and an inverse control function ($f_1^{-1}, \ldots, f_i^{-1}$) for each machine ($K_1, \ldots, K_i$), wherein the control functions ($f_1, \ldots, f_i$) and the inverse control functions ($f_1^{-1}, \ldots, f_i^{-1}$) are generated synchronously or asynchronously with respect to the machines ($K_1, \ldots, K_i$).

11. A computer system comprising a data processing device, the data processing device being configured to perform the method according to claim 7 on the data processing device.

12. A non-transitory digital storage medium having electronically readable control signals, the control signals being capable of interacting with a programmable computer system to perform the method according claim 7.

13. A non-transitory computer program product comprising program code stored on a machine-readable medium for performing the method according to claim 7, when the program code is executed on a data processing device.

14. A computer program comprising program codes, stored on a non-transitory computer readable storage medium, wherein the program codes, when run on a data processing device, carries out the method according to claim 7.

* * * * *